(12) United States Patent
Kobayashi et al.

(10) Patent No.: US 11,178,064 B2
(45) Date of Patent: Nov. 16, 2021

(54) RESOURCE ALLOCATION DEVICE AND RESOURCE ALLOCATION METHOD

(71) Applicant: NIPPON TELEGRAPH AND TELEPHONE CORPORATION, Chiyoda-ku (JP)

(72) Inventors: Masahiro Kobayashi, Musashino (JP); Toshiaki Tsuchiya, Musashino (JP); Ryutaro Matsumura, Musashino (JP); Takumi Kimura, Musashino (JP); Katsunori Noritake, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/308,011

(22) PCT Filed: Apr. 20, 2017

(86) PCT No.: PCT/JP2017/015856
§ 371 (c)(1),
(2) Date: Dec. 7, 2018

(87) PCT Pub. No.: WO2018/029913
PCT Pub. Date: Feb. 15, 2018

(65) Prior Publication Data
US 2019/0199649 A1    Jun. 27, 2019

(30) Foreign Application Priority Data

Aug. 9, 2016 (JP) .............................. JP2016-156708

(51) Int. Cl.
*H04L 12/911* (2013.01)
*H04L 12/24* (2006.01)
(Continued)

(52) U.S. Cl.
CPC .......... *H04L 47/70* (2013.01); *H04L 41/0893* (2013.01); *H04L 47/72* (2013.01);
(Continued)

(58) Field of Classification Search
CPC ..... H04L 47/70; H04L 47/72; H04L 41/0893; H04L 47/781; H04L 67/10; H04L 47/805
See application file for complete search history.

(56) References Cited

U.S. PATENT DOCUMENTS

| 9,087,001 B1 * | 7/2015 | Christensen ........ G06F 11/1484 |
| 2006/0212556 A1 * | 9/2006 | Yacoby ............... H04L 41/0893 |
| | | 709/223 |

(Continued)

FOREIGN PATENT DOCUMENTS

| JP | 2012-150567 A | 8/2012 |
| WO | WO 2007/143904 A1 | 12/2007 |

OTHER PUBLICATIONS

Nikulin et al, A parameterized achievement scalarizing function for multiobjective optimization, Apr. 2010, Turku Centre for Computer Science, TUCS Technical Report No. 969, 28 pages (Year: 2010).*

(Continued)

*Primary Examiner* — John A Follansbee
*Assistant Examiner* — Raqiul A Choudhury
(74) *Attorney, Agent, or Firm* — Oblon, McClelland, Maier & Neustadt, L.L.P.

(57) ABSTRACT

A resource allocation method includes splitting requirements into split requirements for each subsection of a physical network. The subsections of the physical network each have one of a plurality of policies applied to them. The method includes calculating a resource allocation for each of the subsections based on the split requirements, integrates a result of the allocations to determine a plurality of solutions candidates for resource allocations based on the split (Continued)

requirements, evaluates, for each solution candidate, compliance with the one of the plurality of policies, and selects one of the solution candidates based on the evaluation.

14 Claims, 8 Drawing Sheets

(51) Int. Cl.
    *H04L 29/08*     (2006.01)
    *H04L 12/927*     (2013.01)

(52) U.S. Cl.
    CPC ............ *H04L 47/781* (2013.01); *H04L 67/10* (2013.01); *H04L 47/805* (2013.01)

(56) References Cited

U.S. PATENT DOCUMENTS

| | | | |
|---|---|---|---|
| 2008/0002664 A1 | 1/2008 | Li et al. | |
| 2011/0296234 A1* | 12/2011 | Oshins | G06F 9/45558 714/5.11 |
| 2013/0094498 A1* | 4/2013 | Wittenschlaeger | H04L 49/25 370/355 |
| 2016/0212758 A1* | 7/2016 | Leung | G06Q 10/00 |
| 2016/0226774 A1* | 8/2016 | Farmanbar | H04L 47/24 |
| 2017/0214632 A1* | 7/2017 | Ravi | G06F 16/24578 |
| 2018/0191619 A1* | 7/2018 | Karthikeyan | H04L 45/302 |

OTHER PUBLICATIONS

International Search Report dated Jul. 18, 2017 in PCT/JP2017/015856 filed Apr. 20, 2017.

Fischer, A. et al., "Virtual Network Embedding: A Survey," IEEE Communications Surveys & Tutorials, vol. 15, No. 4, Fourth Quarter, 2013, pp. 1888-1906.

Zhong, Q. et al., "A Max-flow/Min-cut Theory Based Multi-Domain Virtual Network Splitting Mechanism," in Proc. APNOMS, 2015, pp. 392-395.

Houidi, I. et al., "Virtual network provisioning across multiple substrate networks," Computer Networks, vol. 55, No. 4, Mar. 2011, pp. 1011-1023.

Dietrich, D. et al., "Multi-Domain Virtual Network Embedding with Limited Information Disclosure," IFIP Networking Conference, 2013, pp. 1-9.

* cited by examiner

FIG.1
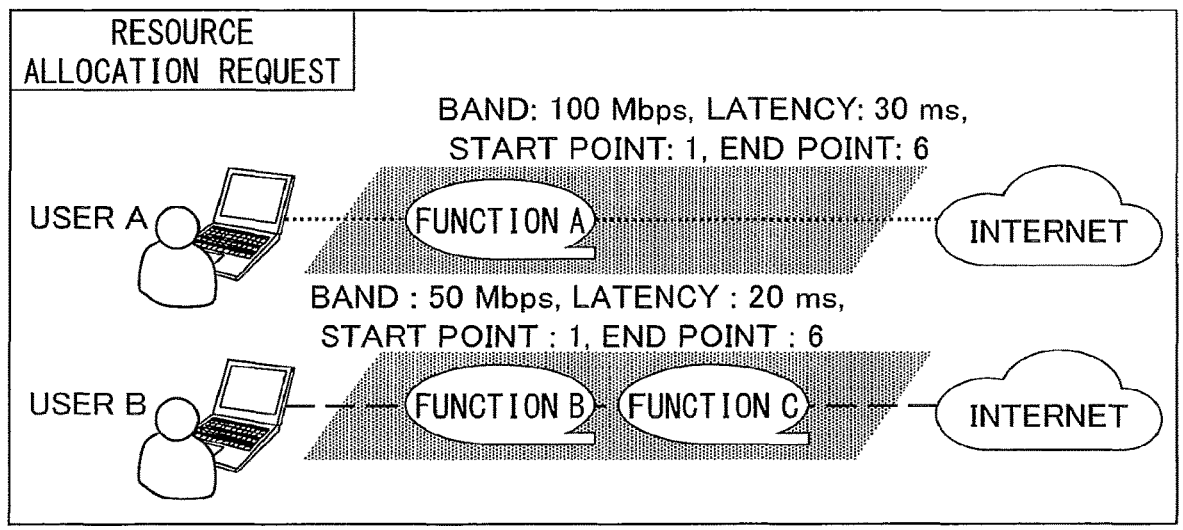
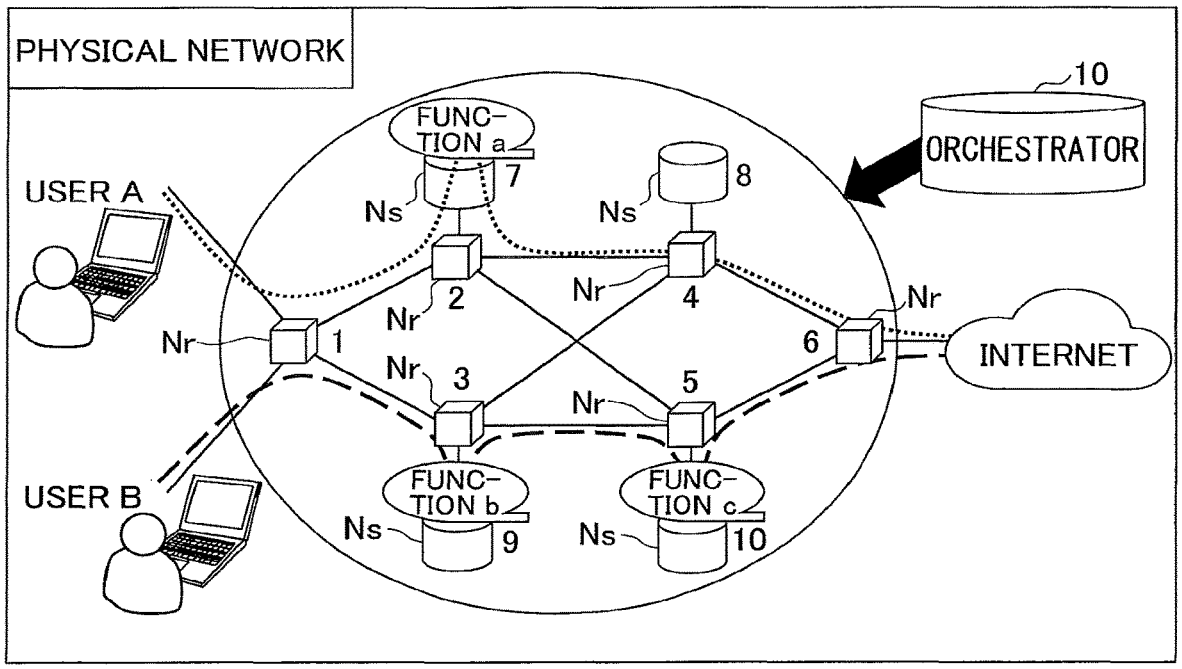

RESOURCE ALLOCATION DEVICE AND RESOURCE ALLOCATION METHOD

TECHNICAL FIELD

The present invention relates to a resource allocation device and a resource allocation method.

BACKGROUND ART

Virtualization has been advancing not only in the field of cloud computing but also in the field of communication networks, with progress of virtualization technologies. In virtualization in a communication network, a service provider can provide flexible services by readily utilizing network resources and service functions prepared in advance on the network. Technologies that realize this are NFV (Network Functions Virtualization) and SFC (Service Function Chaining). The NVF technology enables to provide service functions of a telecommunications carrier as software on a general-purpose server, which have conventionally been implemented by dedicated hardware such as routers and gateways. Therefore, a service function becomes executable on all servers that exist on the network. Also, the SFC technology enables to transmit a flow to a designated service function in a correct order, and thereby, enables to readily provide the service function.

In this virtualized network, services are provided by allocating resources of a physical network provided by a telecommunications carrier to a virtual network (VN: Virtual Network) generated based on requests of a service provider. This resource allocation problem is called a virtual network embedding (VNE), and many technologies have been proposed. In general, allocation of physical network resources based on a certain objective function (called a "policy") is performed so as to satisfy the requirements of the VN (FIG. 1).

Conventional technologies related to VNE are roughly classified into two. One is a technology that applies the same policy to the entire network and the other is a technology that applies multiple policies.

In the resource allocation based on a single policy, various policies have been proposed, which may put emphasis on CAPEX (capital expenditure) (to minimize resource consumption), emphasis on QoS (quality of service) (to minimize latency), emphasis on reliability (to minimize failure probability), emphasis on OPEX (to minimize power consumption), and the like (e.g., Non-Patent Document 1).

In the resource allocation based on multiple policies, it is assumed that the network is split into multiple domains, and a specific policy is applied to each domain (FIG. 2). In a resource allocation across multiple domains, requirements are split for respective domains, and results of resource allocations for the respective domains are integrated to obtain an allocation result that does not violate the policies as a whole. In such a case, according to conventional technologies, a result that minimizes the resource consumption of the entire network is selected (e.g., Non-Patent Documents 2 to 4).

RELATED ART DOCUMENTS

Non-Patent Documents

Non-Patent Document 1: A. Fischer, et al., "Virtual Network Embedding: A Survey", IEEE Communications Surveys & Tutorials, Vol. 15, No. 4, FOURTH QUARTER, 2013

Non-Patent Document 2: Q. Zhong, et al., "A max-flow/min-cut theory based multi-domain virtual network splitting mechanism", in Proc. APNOMS, 2015

Non-Patent Document 3: I. Houidi, et al., "Virtual network provisioning over multiple substrate networks", Computer Networks, Vol. 55, No. 4, March 2011, pp. 1011-1023

Non-Patent Document 4: D. Dietrich, et al., "Multi-Domain Virtual Network Embedding with Limited Information Disclosure", IFIP Networking Conference, 2013

SUMMARY OF INVENTION

Problem to be Solved by the Invention

However, in the resource allocation based on multiple policies in the conventional technologies, degree of importance of the policy applied to each domain is not considered. For example, as illustrated in FIG. 3, assume that two solution candidates are found, each of which satisfies requirements of a certain VN. A conventional technology selects a solution candidate 1 that consumes fewer resources on the entire network.

However, in a real operation environment, there may be a case in which emphasis is not necessarily put on minimizing the resource consumption. In the example in FIG. 3, the solution candidates 1 and 2 pass through different domains (the solution candidate 1 passes through a domain C, whereas the solution candidate 2 passes through a domain D). In the case where the domain C is affected by a disaster, to which a policy emphasizing the reliability is applied, and it is desirable to avoid using the disaster-affected resources as much as possible, it may be preferable for the telecommunications carrier not to adopt the solution candidate 1, but to adopt the solution candidate 2 as the solution even if the resource usage increases somewhat. As such, it is necessary to perform a resource allocation considering the importance of the policies.

Also, although the total resource usage is smaller in the solution candidate 1, when considering the domains individually, in the domain A, the solution candidate 1 exhibits a lower resource usage, whereas in the domain B, the solution candidate 2 exhibits a lower resource usage. If the facility cost of the domain B is overwhelmingly smaller than that of the domain A, it may be preferable for the telecommunications carrier to select the solution candidate 2 as the solution. As such, it is necessary to consider the importance even among domains to which the same policy is applied. Thus, it is desirable to perform a resource allocation that enables not only to minimize the total resource usage as described above, but also to take the importance of the policies of the domains into account.

The present invention has been made in view of the above respects, and aims at enabling to allocate resources in consideration of the importance of different policies for each subsection of a network.

Means for Solving the Problem

In order to solve the above-mentioned problem, a resource allocation device includes a splitter configured to split requirements related to use of resources of a physical network to which a policy different for each subsection is applied with respect to allocation of the resources, into split requirements for each of the subsections; a calculator configured to calculate, for each of the subsections, a resource allocation that satisfies the split requirements for the subsection according to the policy applied to the subsection; an integrator configured to integrate results of the resource allocations by the calculator, to calculate a plurality of solution candidates for a resource allocation that satisfies the requirements for the physical network; an evaluator configured to calculate, for each of the solution candidates, for each of the subsections, a first evaluation value representing a degree to what extent the resource allocation by the solution candidate in the subsection conforms to the policy applied to the subsection; and a selector configured to calculate a second evaluation value obtained by giving weights to the first evaluation values calculated for the respective subsections for each of the solution candidates according to importance of the policies applied to the respective subsections, and scalarizing the weighted first evaluation values, to select one of the solution candidates based on comparison of the second evaluation values among the solution candidates.

Advantage of the Invention

It is possible to allocate resources in consideration of the importance of different policies applied to respective subsections of the network.

BRIEF DESCRIPTION OF DRAWINGS

FIG. 1 is a diagram illustrating an example of allocations of physical resources upon a service request;

EMBODIMENTS OF THE INVENTION

In the following, embodiments of the present invention will be described with reference to the drawings. In the embodiments, as an evaluation value of a resource allocation solution of a network, a value is obtained by scalarizing evaluation values of domains each of which represents a degree of conformance to the policy of the domain, by considering weights reflecting the importance of the policies. When allocating resources to a new service, by searching for a solution with the best evaluation value, it becomes possible to obtain a solution in which conformance to a more important policy is prioritized.

The operating environment as a prerequisite for operating the system is a virtualized network as illustrated in FIG. 1. It is assumed that in a form of providing services that provide multiple services on a single physical network, resources are allocated to respective services based on specified policies.

The physical network is modeled as a weighted undirected graph G, and is constituted with transfer nodes Nr represented by a router, server nodes to execute service functions, and links that connect the nodes. Resources of the physical network are classified into two types, namely, transfer-related resources and server-related resources.

Transfer-related resources mainly indicate resources of a link between transfer nodes Nr, specifically, the transfer band and the like specified for each link. In addition to the transfer band, transfer latency, failure rate, and the like are set to each link.

Server-related resources indicate resources of a server node Ns, specifically, a CPU, a memory, a storage, and the like. Here, for the sake of simplifying the description, various server-related resources are collectively referred to as "processing resources", and the amount of resources is represented by a single numerical value.

Each of the transfer nodes Nr is provided with a function that is capable of controlling a route in the network by software, such as SDN (Software Defined Network), and the route is controlled by an orchestrator 10 in a centralized way. The orchestrator 10 is a computer that manages and controls allocation states of the resources of the entire network.

The server nodes Ns are assumed to be commonly capable of executing service functions implemented by software, and a certain service function can be executed on any of the server nodes Ns. The orchestrator 10 manages execution nodes of service functions similarly to the route management. Operations for this management assume general NFV and SFC operations.

Each service is set with, as requirements for the service to be provided, a transfer band b, a transfer latency d, service functions $f=[f_1, f_2, \ldots, f_n]$ to be received on the route ($f_x$ represents a service function, and n represents the number of on-the-route service functions), a start point s of the service, an end point e, and the like. In the case of a user B in FIG. 1, b=50 Mbps, d=20 ms, f=[a, b], s=1, and e=6.

Figure 2:
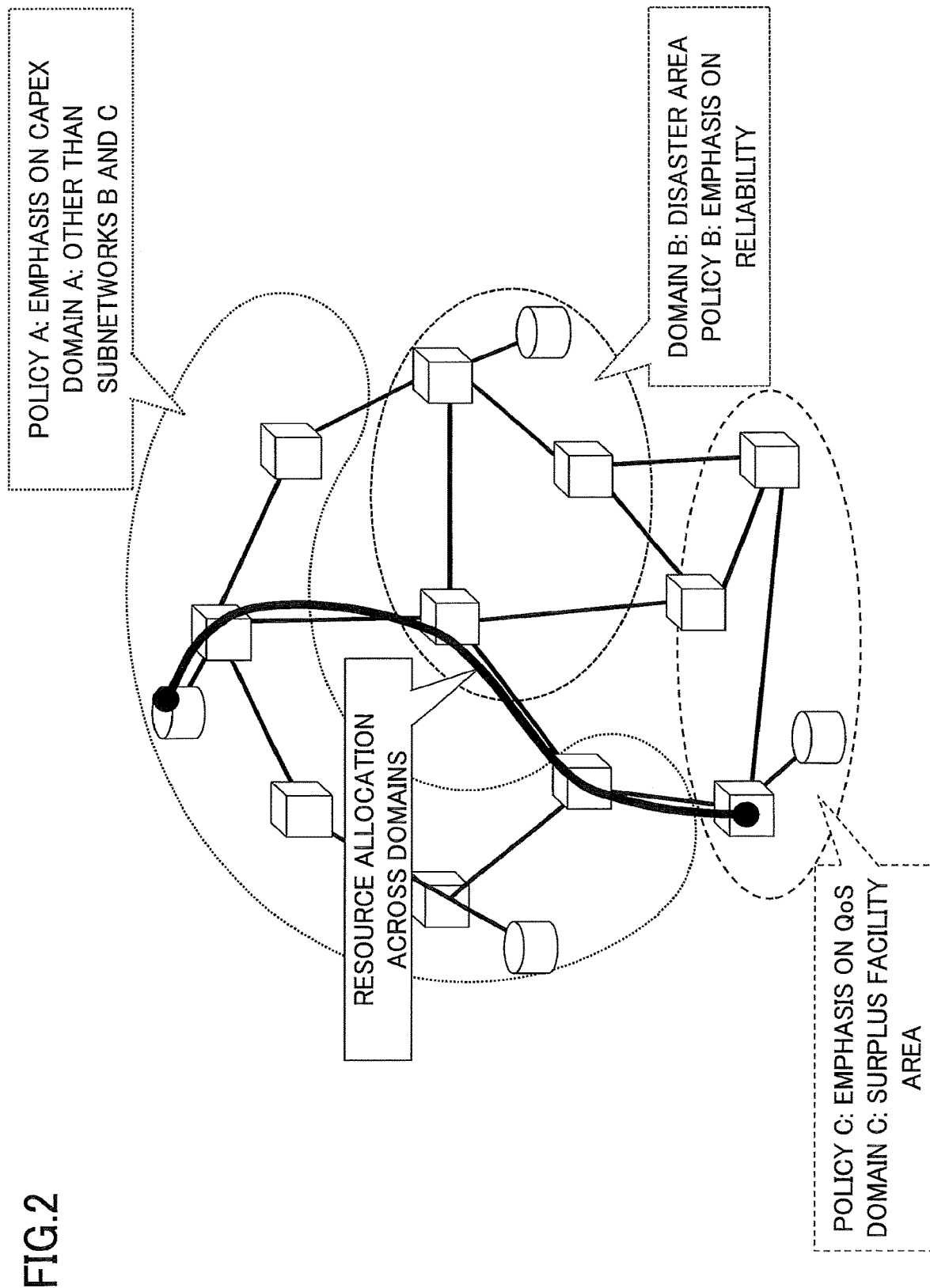
FIG. 2 is a diagram illustrating an example in which multiple resource allocations with different allocation policies are performed on one network.

Also, as illustrated in FIG. 2, the physical network is split into multiple subsections (referred to as "domains", below), and different policies are applied to the respective domains. The operator has given in advance domain names (if representing the set by D, D=[A, B] in the case of the example in FIG. 2); subnetworks as subnetworks corresponding to the domains, respectively (a subnetwork of a domain $x \in D$ is denoted as $G_x$); types of policies to be applied to the domains (a policy applied to a domain $x \in D$ is denoted as $P_x$); and the importance of each policy, which are held in the orchestrator 10.

Figure 4:
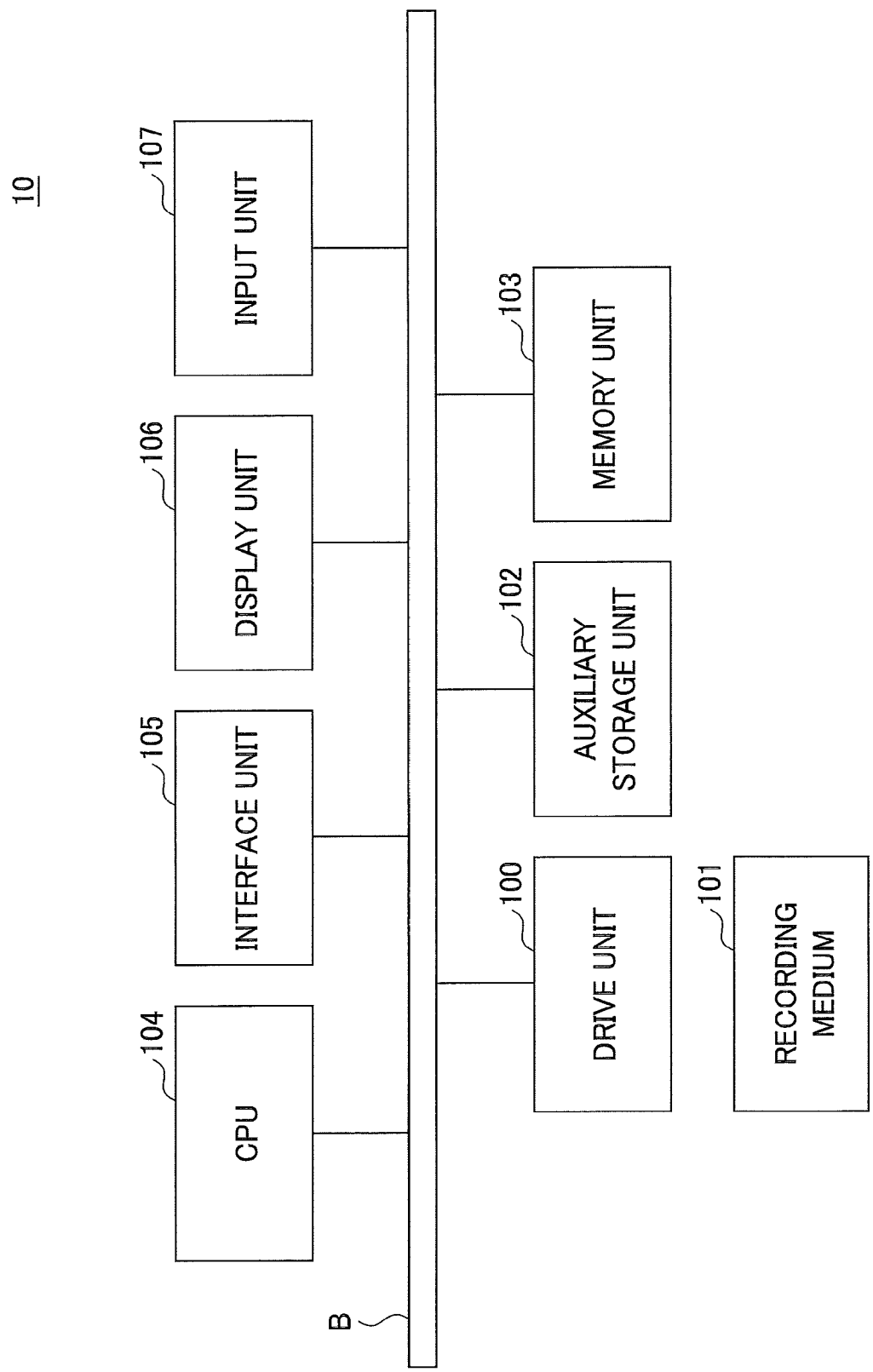
FIG. 4 is a diagram illustrating an example of a hardware configuration of an orchestrator according to an embodiment of the present invention.

FIG. 4 is a diagram illustrating an example hardware configuration of the orchestrator according to the embodiment of the present invention. The orchestrator 10 in FIG. 4 includes a drive unit 100, an auxiliary storage unit 102, a memory unit 103, a CPU 104, an interface unit 105, a display unit 106, and an input unit 107, which are mutually connected by a bus B.

A program that implements processing on the orchestrator 10 is provided with a recording medium 101 such as a CD-ROM. Once the recording medium 101 storing the program is set in the drive unit 100, the program is installed into the auxiliary storage unit 102 from the recording medium 101 via the drive unit 100. However, installation of the program is not necessarily executed from the recording medium 101, and may also be downloaded from another computer via the network. The auxiliary storage unit 102 stores the installed program, and stores required files, data, and the like as well.

Upon receiving a command to activate the program, the memory unit 103 reads out the program from the auxiliary storage unit 102, to load the program. The CPU 104 implements a function related to the orchestrator 10, based on the program loaded in the memory unit 103. The interface unit 105 is used as an interface for connecting with a network. The display unit 106 displays a GUI (Graphical User Interface) and the like by the program. The input unit 107 is constituted with a keyboard, a mouse, and the like, and is used for inputting various operation commands.

Figure 5:
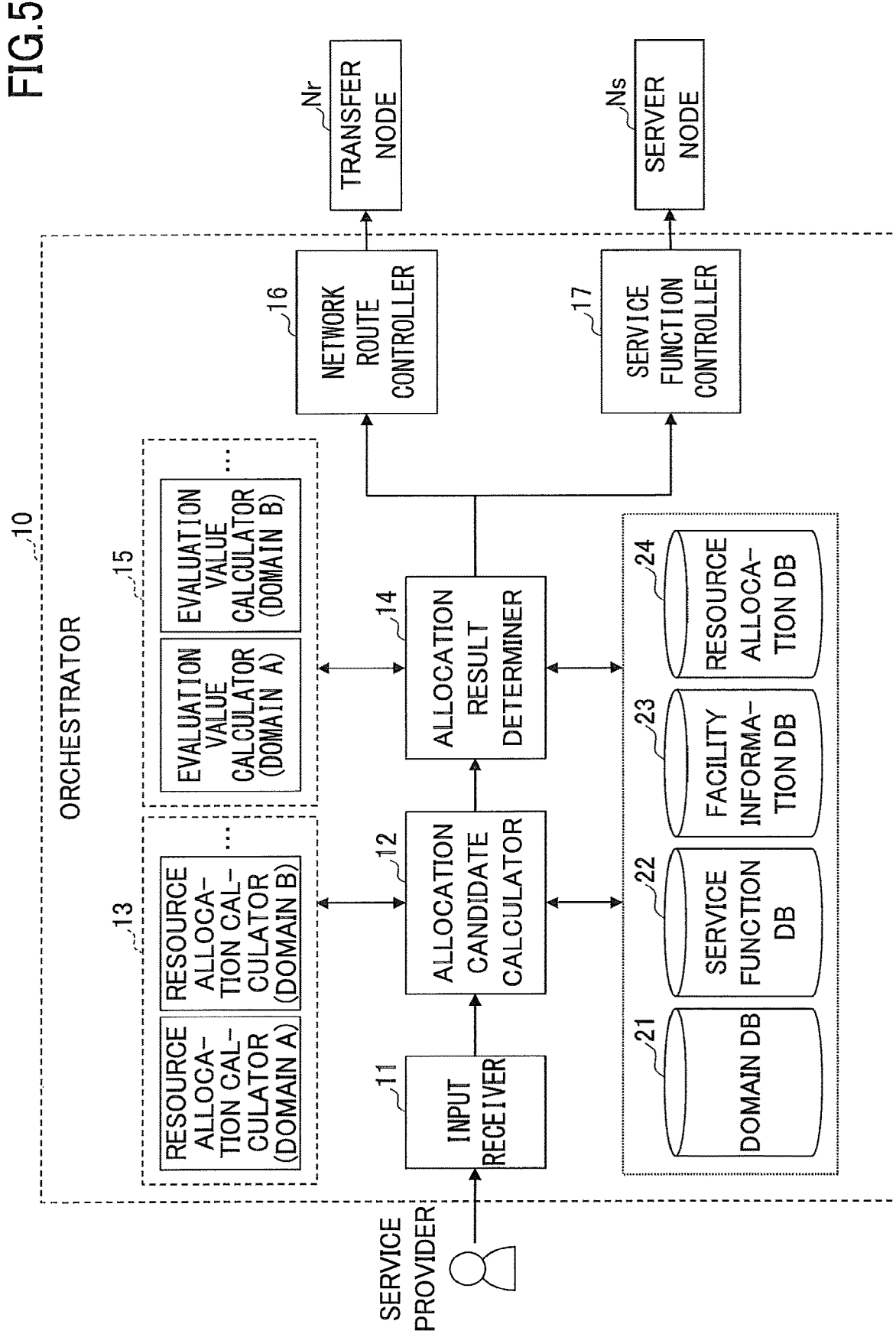
FIG. 5 is a diagram illustrating an example of a functional configuration of an orchestrator according to an embodiment of the present invention.

FIG. 5 is a diagram illustrating an example of a functional configuration of the orchestrator according to the embodiment of the present invention. In FIG. 5, the orchestrator 10 includes an input receiver 11, an allocation candidate calculator 12, a resource allocation calculator 13 for each domain, an allocation result determiner 14, an evaluation value calculator 15 for each domain, a network route controller 16, and a service function controller 17. These units are implemented by processes which one or more programs installed in the orchestrator 10 cause the CPU 104 to execute. The orchestrator 10 also uses databases including a domain DB 21, a service function DB 22, a facility information DB 23, and a resource allocation DB 24. These databases (storage units) can be implemented, for example, by using the auxiliary storage unit 102 or a storage device or the like that can be connected to the orchestrator 10 via a network.

The resource allocation DB 24 stores information on resources that have been allocated to existing services. An existing service is a service to which resources have already been allocated.

The service function DB 22 stores, for each service function, the amount of resources necessary for executing the service function (function A: 5, function B: 2, etc.).

The facility information DB 23 stores topological information on the physical network (connection information between the transfer nodes Nr and the server nodes Ns, the transfer band, the transfer latency, and the failure rate of each link, the total amount of processing resources of the server nodes Ns, etc.).

The domain DB 21 stores the name of each domain, information indicating sections of subnetworks of each domain, the type of a policy applied to each domain, and the importance of the policy applied to each domain.

Figure 6:
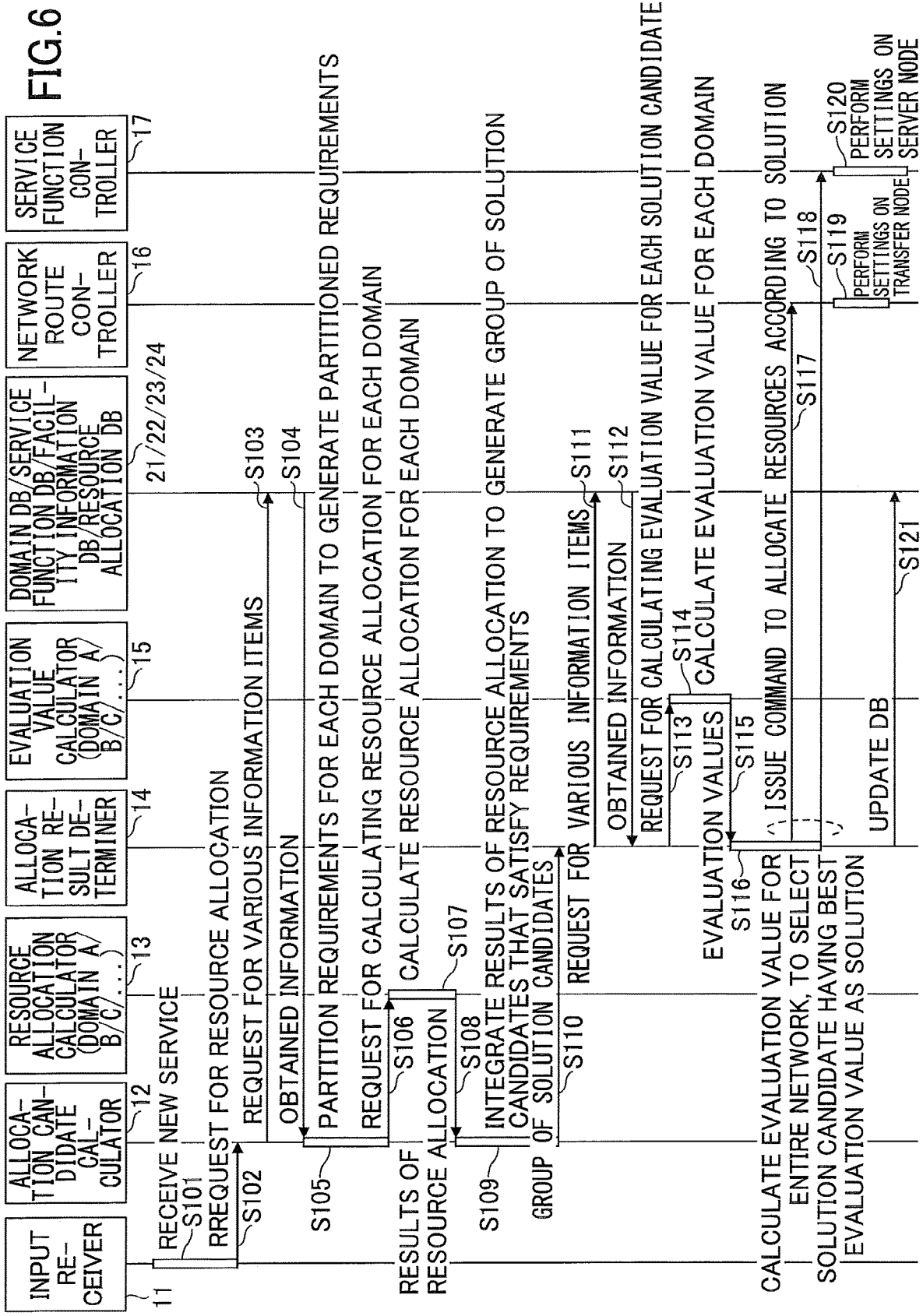
FIG. 6 is a sequence chart for describing an example of processing steps executed by an orchestrator.

In the following, processing steps executed by the orchestrator 10 will be described. FIG. 6 is a sequence chart for describing an example of processing steps executed by the orchestrator.

Upon receiving an input of requirements for a new service from an operator of a service provider (S101), the input receiver 11 transmits a resource allocation request for the service to the allocation candidate calculator 12 (S102). In the resource allocation request, the requirements that have been input are specified.

Next, the allocation candidate calculator 12 obtains information stored in the domain DB 21, the service function DB 22, the facility information DB 23, and the resource allocation DB 24 (S103 and S104). Next, the allocation candidate calculator 12 uses the obtained information, to split the requirements for the entire network into requirements for the respective domains (S105). In the following, requirements split for each domain is referred to as "split requirements".

Figure 3:
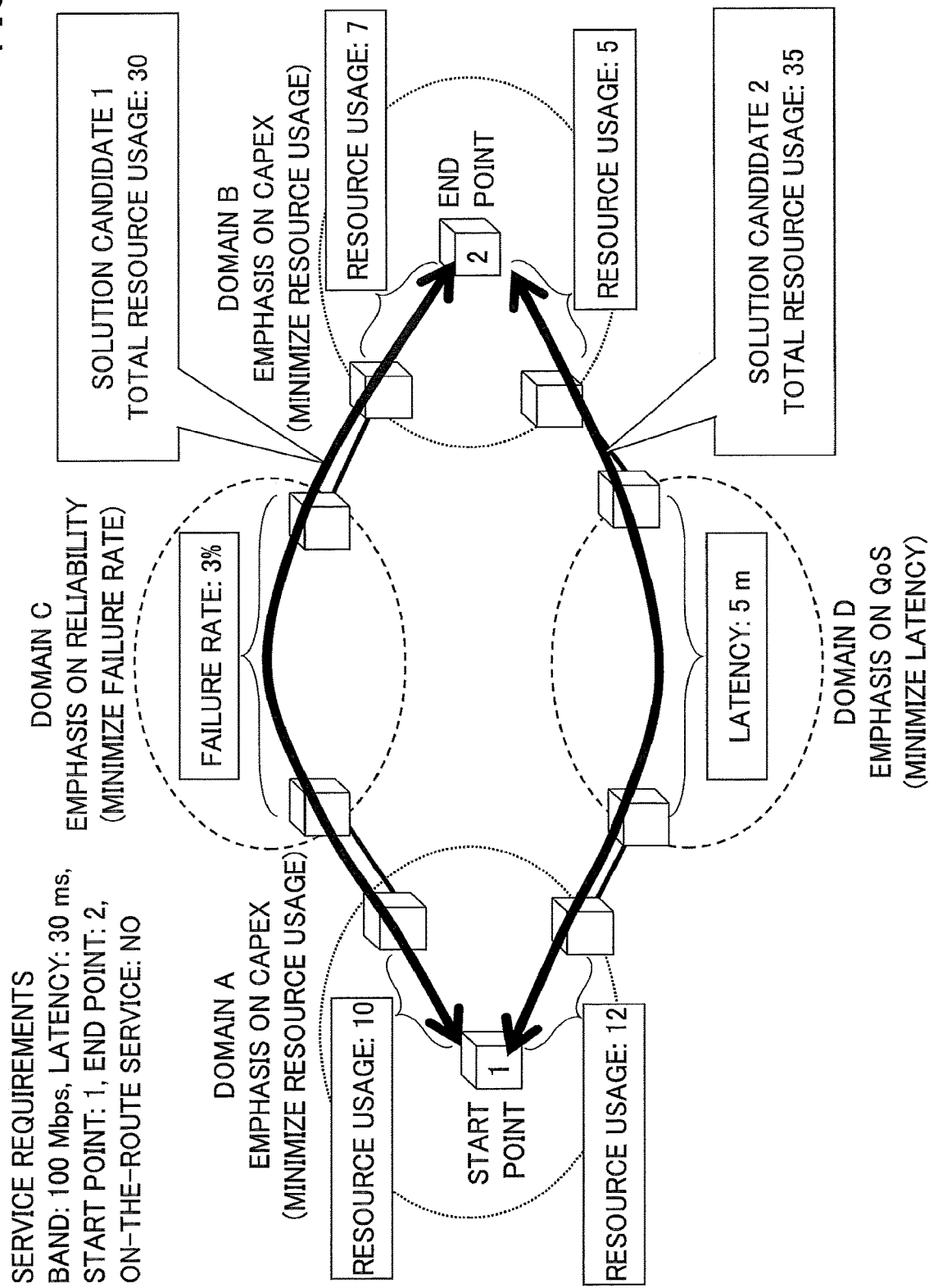
FIG. 3 is a diagram illustrating an example of a resource allocation not considering importance of policies for each domain.

An example of split of requirements will be described. As described above, requirements are constituted with the transfer bandwidth b, the transfer latency d, the service function $f=[f_1, f_2, \ldots, f_n]$ to be received on the route, the start point s of the service, and the end point e. Here, the start point s and the end point e of the service are split as a start point $s_x$ and an end point $e_x$ of the service for each domain x. The start point $s_x$ of each domain x is a transfer node Nr in the domain x that is located at the boundary with another domain adjacent in the direction toward the start point s. The end point $e_x$ of each domain x is a transfer node Nr in the domain x that is located at the boundary with another domain adjacent in the direction toward the end point e. However, the start point $s_x$ of the domain that includes the start point s (the domain A in the example in FIG. 3) coincides with the start point s. Further, the end point $e_x$ of the domain that includes the end point e (the domain B in the example in FIG. 3) coincides with the end point $e_x$.

Further, the transfer band b, the transfer latency d, and the service functions f may be evenly allocated to the domains; may be allocated in proportion to the size of the domains; or may be allocated in accordance with another rule. The size of a domain may be evaluated by, for example, the number of nodes and/or the number of links.

As obvious from the above, split of requirements can be made in various patterns (referred to as "split patterns", below). In the embodiment, the requirements are split by multiple split patterns. As a result, each domain has split requirements allocated for each split pattern.

Next, the allocation candidate calculator 12 requests the resource allocation calculator 13 corresponding to each domain, for each split pattern, to calculate a resource allocation according to the split requirements and the policy corresponding to the domain (S106). At this time, the allocation candidate calculator 12 generates an undirected graph G based on the topological information of the physical network obtained from the facility information DB 23. Further, based on the allocated resource information obtained from the resource allocation DB 24, the allocation candidate calculator 12 generates a virtual network obtained by subtracting the resource capacity allocated to the existing services from the undirected graph G (referred to as a "residual network G⁻", below). The allocation candidate calculator 12 requests the resource allocation calculator 13 corresponding to each domain to calculate a resource allocation to each domain on the residual network G⁻.

Based on a constraint of the residual network G⁻, each of the resource allocation calculators 13 calculates, for each split pattern, a resource allocation within the domain that satisfies the split requirements specified according to the policy for the domain (S107), and returns the result of the resource allocation for each split pattern to the allocation candidate calculator 12 (S108). For example, a resource allocation result for one split pattern in one domain is information constituted with a route allocation $r=[n_1, n_2, \ldots, n_m]$ (m represents the route length) and a server allocation $s=[s_1, s_2, \ldots, s_n]$ (n represents the number of on-the-route service functions, and $s_x$ represents a node at the x-th stage on the route on which the service function $f_x$ is executed).

Note that a resource allocation according to a policy in each domain can be performed based on publicly known technologies. For example, an optimum route conforming to the policy is calculated as a result of the resource allocation. The optimum route conforming to a policy varies according to the policy. For example, in the case of emphasizing CAPEX, the optimal route is a route with the minimum resource consumption.

Next, the allocation candidate calculator 12 integrates, for each split pattern, results of the resource allocations from the resource allocation calculators 13, to generate a group of multiple solution candidates that satisfy the requirements (S109). In other words, one solution candidate is generated for one split pattern. Note that in integration of results of resource allocations for a certain split pattern, a route allocation r and a server allocation s are generated for a route that connects optimum routes calculated in the respective domains with respect to the split pattern.

The allocation candidate calculator 12 inputs the group of generated solution candidates and the residual network G⁻ into the allocation result determiner 14 (S110). Each solution candidate is constituted with a route allocation and a server allocation.

Next, the allocation result determiner 14 executes a process for selecting a solution candidate having the best evaluation value on the entire network as the solution from among the group of solution candidates.

First, the allocation result determiner 14 obtains information stored in the domain DB 21, the service function DB 22, the facility information DB 23, and the resource allocation DB 24 (S111 and S112). Next, the allocation result determiner 14 requests each of the evaluation value calculators 15 to calculate, for each solution candidate, an evaluation value representing a degree of conformity to the policy of the corresponding domain (S113). At this time, for each solution candidate, from the residual network G⁻, a residual network after allocating resources according to the solution candidate is generated as a residual network G⁻, and the residual network G⁻ for each solution candidate is input into the evaluation value calculator 15.

Each of the evaluation value calculators 15 calculates, for each solution candidate, an evaluation value representing a degree of conformity to the policy of the domain assigned to the evaluation value calculator 15 (S114).

Specifically, each of the evaluation value calculators 15 calculates for a domain $x \in D$ assigned to the evaluation value calculator 15, for each solution candidate, an evaluation value $E_x$ representing to what extent the state of the residual network $G^-_x$ in the current domain x conforms to the policy $P_x$. Examples of calculation formulas will be described in the following, for the cases where the policy $P_x$ emphasizes CAPEX, emphasizes QoS, and emphasizes reliability.

[Case of Emphasizing CAPEX]

The evaluation value $E_x$ is defined as the total value of the amounts of allocated resources in $G^-_x$ of the subnetwork. In the case of defining the evaluation value in this way, a smaller resource usage of the domain results in a smaller evaluation value, which means a better conformity to the CAPEX-emphasizing policy.

$$E_x = w_b \times \sum_{l \in L'} (b_l - b'_l) + w_c \times \sum_{n \in N^s} (c_n - c'_n)$$

where L' represents a set of links in $G^-_x$; $b_l$ represents a physical band of a link $l \in L'$; $b'_l$ represents a residual band of the link $l \in L'$; $N^s$ represents a set of server nodes in $G^-_x$; $c_n$ represents a total amount of processing resources of a server node $n \in N^s$; and $c'_n$ represents an amount of residual processing resources of the server node $n \in N^s$. Therefore, the terms $(b_l - b'_l)$ and $(c_n - c'_n)$ in the expression represent the band already allocated to the existing services, and the amount of processing resources, respectively.

[Case of Emphasizing QoS]

The evaluation value $E_x$ is defined as the total of the sum of (consumed band×transfer latency) in the links. In the case of defining the evaluation value in this way, the evaluation value becomes smaller when the resource allocation is prioritized for links on the shortest route as much as possible, which means a better conformity to the QoS-emphasizing policy.

$$E_x = \sum_{l \in L'} (b_l - b'_l) \times d_l$$

where $d_l$ represents a latency in a link $l \in L'$.

[Case of Emphasizing Reliability]

The evaluation value $E_x$ is defined as the total of the sum of (consumed band×failure rate) in links. In the case of defining the evaluation value in this way, the evaluation value becomes smaller when the resource allocation is prioritized for a link having a smaller failure rate as much as possible, which means a better conformity to the reliability-emphasizing policy.

$$E_x = \sum_{l \in L'} (b_l - b'_l) \times f_l$$

where $f_l$ represents a failure rate at a link $l \in L'$.

Next, each of the evaluation value calculators 15 normalizes the corresponding evaluation value. First, the evaluation value is converted to fall within the interval of [0, 1]. In the above three examples, the evaluation value in the residual network using all the resources is the greatest (denoted as $E_{max}$), and the evaluation value of the residual network when the resources are not used at all is the smallest. Therefore, dividing the evaluation value $E_x$ by $E_{max}$ makes the evaluation value converted to fall within the interval of [0, 1]. Note that if the evaluation value becomes greater when better conforming to the policy, the evaluation value is corrected to become smaller. For example, if the conversion to [0, 1] has been completed, such a correction can be done by subtracting the evaluation value from 1. The normalized evaluation value is denoted as $E^N_x$.

Next, each of the evaluation value calculators 15 returns, for each solution candidate, the normalized evaluation value $E^N_x$ to the allocation result determiner 14 (S115).

Next, based on the evaluation value $E^N_x$ of each solution candidate from each of the evaluation value calculators 15 and the importance of the policy of each domain, for each solution candidate, the allocation result determiner 14 calculates the evaluation value $E_{total}$ of the entire network for the solution candidate, and compares the evaluation values $E_{total}$ among the solution candidates, to select one solution candidate as the solution of the resource allocation (S116). In other words, the minimum evaluation value $E_{total}$ is selected as the solution of the resource allocation.

Specifically, the allocation result determiner 14 defines a weight that reflects the importance of the policy for each domain $x \in D$ as $w_x$, and scalarizes the normalized evaluation values $E^N_x$ of the respective domains, to take the scalarized value as the evaluation value $E_{total}$ of the entire network. Various methods of scalarization have been known, which include a linear weighted sum, the Tchebyshev scalarization function, and the extended Tchebyshev scalarization function. Here, the above three examples are described as representatives.

[Linear Weighted Sum]

$$E_{total} = \sum_{x \in D} (w_x \times E^N_x)$$

[Tchebyshev Scalarization Function]

$$E_{total} = \max_{x \in D}(w_x \times E_x^N)$$

[Extended Tchebyshev Scalarization Function]

$$E_{total} = \max_{x \in D}(w_x \times E_x^N) + \alpha \times \sum_{x \in D}(w_x \times E_x^N)$$

A greater weight $w_x$ means the importance of the policy of the domain x is higher. A smaller $E_{total}$ means that a resource allocation better conforming to an important policy is realized.

A resource allocation solution is represented by a route allocation $r=[n_1, n_2, \ldots, n_m]$ (m represents the route length) and a server allocation $s=[s_1, s_2, \ldots, s_n]$ (n represents the number of on-the-route service functions, and $s_x$ represents a node at the x-th stage on the route on which the service function $f_x$ is executed). In the case of the example of the user B in FIG. 1, the result of the resource allocation is a route allocation r=[1, 2, 7, 2, 4, 8, 4, 6], and a server allocation s=[7, 8].

Next, based on the solution of the resource allocation, the allocation result determiner 14 issues a command to allocate resources to each of the network route controller 16 and the service function controller 17 to allocate resources (S117 and S118). In response to the command, the network route controller 16 performs setting for allocating resources for the service functions on the transfer nodes Nr (S119). In response to the command, the service function controller 17 performs setting for allocating resources for the service functions on the server nodes Ns (S120).

Next, the allocation result determiner 14 reflects the result of the resource allocation in the resource allocation DB 24 (S121).

Also, in calculation of a group of solution candidates, the allocation candidate calculator 12 may search for all solution candidates, or may heuristically search for a part of solution candidates expected to have good evaluation values. In the case of searching for all solution candidates, when splitting the requirements for the entire network into requirements for each domain, resource allocation calculation may be performed for all the split patterns. In the case of searching for a part of solution candidates, calculation of the evaluation value in the allocation result determiner 14 may be performed sequentially during the search, to select only split patterns empirically expected to have more favorable evaluation values of the domains, so as to reduce the number of search routes.

Next, a specific example of the embodiment will be described below. Consider a case where resources are allocated to a physical network in FIG. 7 under the following conditions. The physical network is split into four domains A to D where a CAPEX-emphasizing policy is applied to the domains A and B, a reliability-emphasizing policy is applied to the domain C, and a QoS-emphasizing policy is applied to the domain D. Assume that the domain C is experiencing a disaster, the domains A and B have higher facility costs, and the domain D has a lower facility cost. As a new service request has a node within the domain A as the start point and a node within the domain B as the end point, the allocation spans across the domains. The weights of the policies are specified such that domain C (emphasis on reliability) >domain B (emphasis on CAPEX)>domain A (emphasis on CAPEX)>domain D (emphasis on QoS).

Figure 7:
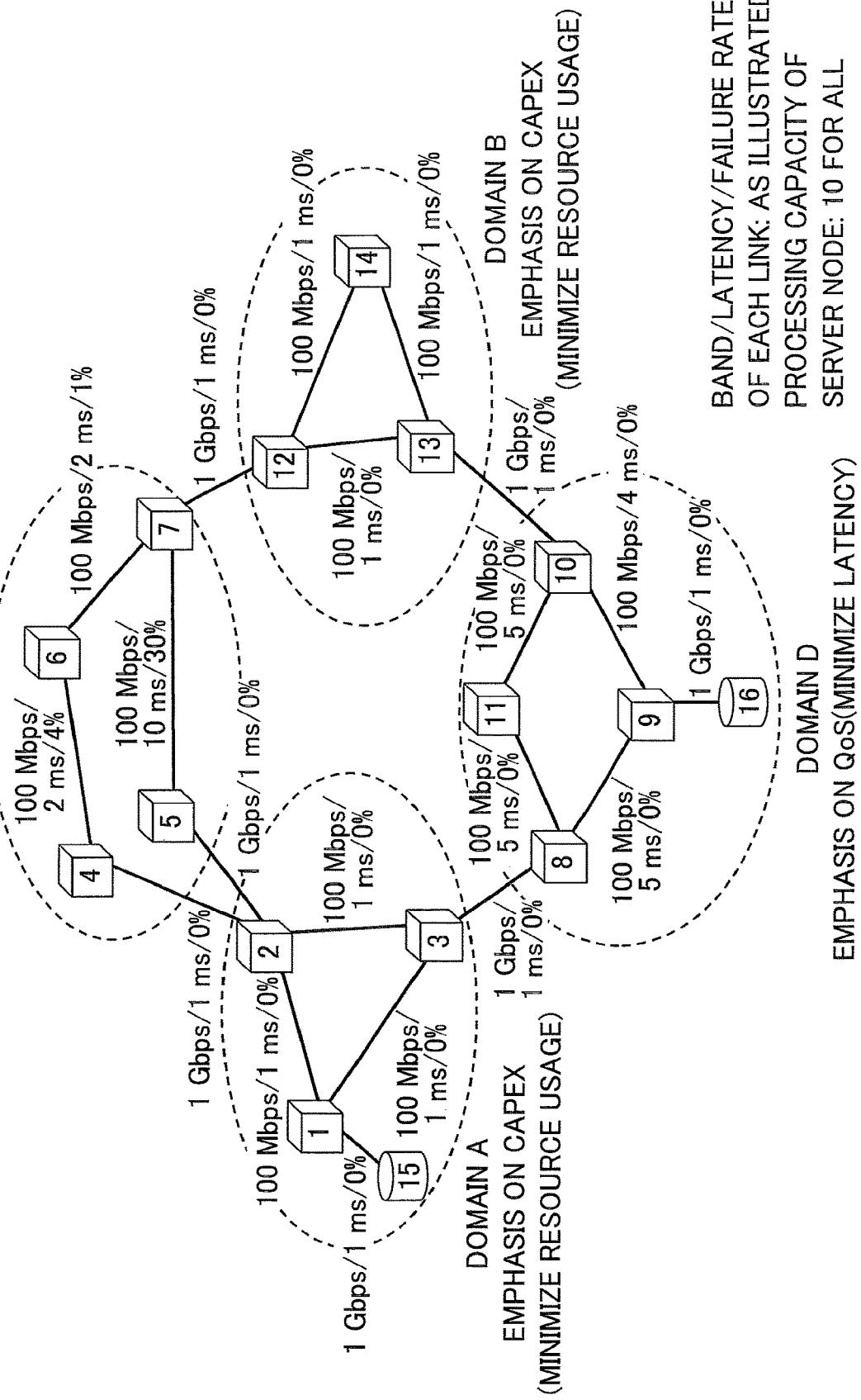
FIG. 7 is a diagram illustrating a specific example of a physical network.
Figure 8:
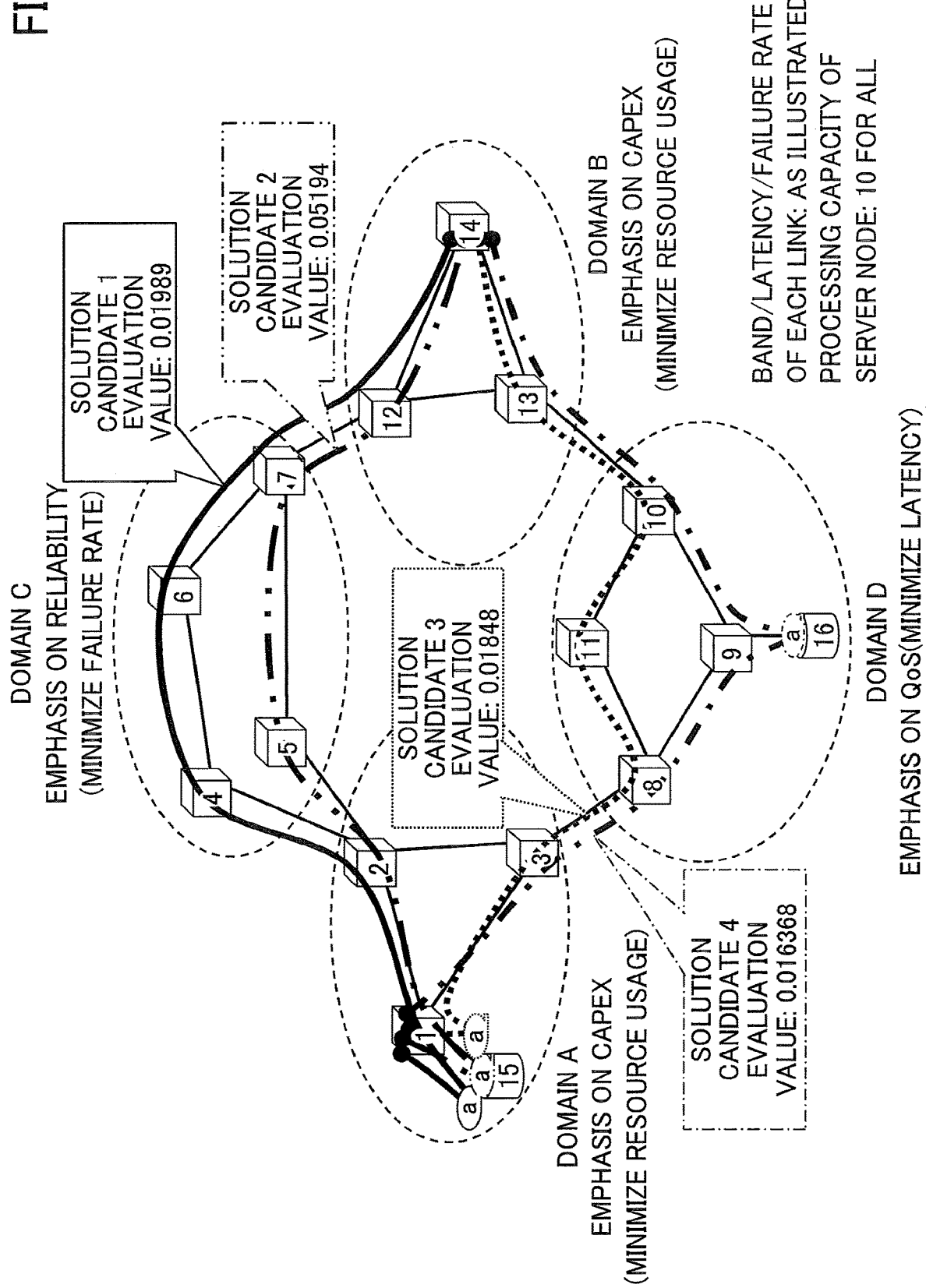
FIG. 8 is a diagram illustrating an example of a solution candidate for a physical network.

[Resource Allocation Requirements]
Existing services: None
New resource allocation request: start point=1, end point=14, band b=10 Mbps, latency d=20, on-the-way service function f=[a]
Amount of resources consumed by the function a: 1
Physical network: as illustrated in FIG. 7
Weights of the policies: $w_A$=0.2, $w_B$=0.3, $w_C$=0.5, $w_D$=0.1
Weights in calculation of the evaluation value when minimizing the resource consumption: $w_b$=1, $w_c$=$10^7$ Assume that four solution candidates as illustrated in FIG. 8 are found as solution candidates that satisfy the requirements of the new resource allocation. Each evaluation value $E_{total}$ is as follows. The scalarization method when calculating an evaluation value uses a linear weighted sum.

[Solution Candidates]
(1) Solution candidate 1: route allocation r=[1, 15, 1, 2, 4, 6, 7, 12, 14], server allocation s=[15]
$E_A$=(1×10 M×3+$10^7$×1)/(1×100 M×3+1 G×1+10×$10^7$×10) ≈0.01739
$E_B$=(10 M×1)/(100 M×3)≈0.03333
$E_C$=(10 M×4%+10 M×1%)/(100 M×(4%+5%+30%)) ≈0.01282
$E_D$=0
$E_{total}$=0.2×0.01739+0.3×0.03333+0.5×0.01282+0.1× 0≈0.01989

(2) Solution candidate 2: route allocation r=[1, 15, 1, 2, 5, 7, 12, 14], server allocation s=[15]
$E_A$=(10 M×3+$10^7$×1)/(1×100 M×3+1 G×1+10×$10^7$×10) ≈0.01739
$E_B$=(10 M×1)/(100 M×3)≈0.03333
$E_C$=(10 M×30%)/(100 M×(4%+5%+30%))≈0.07692
$E_D$=0
$E_{total}$=0.2×0.01739+0.3×0.03333+0.5×0.07692+0.1× 0≈0.05194

(3) Solution candidate 3: route allocation r=[1, 15, 1, 3, 8, 11, 10, 13, 14], server allocation s=[15]
$E_A$=(10 M×3+$10^7$×1)/(1×100 M×3+1 G×1+10×$10^7$×10) ≈0.01739
$E_B$=(10 M×1)/(100 M×3)≈0.03333
$E_C$=0
$E_D$=(10 M×(5 m+5 m))/(100 M×(5 m+5 m+5 m+1 m+4 m))≈0.05
$E_{total}$=0.2×0.01739+0.3×0.03333+0.5×0+0.1×0.05≈0.01848

(4) Solution candidate 4: route allocation r=[1, 3, 8, 9, 16, 9, 10, 13, 14], server allocation s=[16]
$E_A$=(10 M×1)/(1×100 M×3+1 G×1+10×$10^7$×10)≈0.004347
$E_B$=(10 M×1)/(100 M×3)≈0.03333
$E_C$=0
$E_D$=(10 M×(5 m+1 m+1 m+4 m))/(100 M×(5 m+5 m+5 m+1 m+4 m))≈0.055
$E_{total}$=0.2*0.004347+0.3*0.03333+0.5*0+ 0.1*0.055=0.016368

As the solution, the solution candidate 4 having the best (minimum) evaluation value of $E_{total}$ is selected. Comparing the evaluation values of $E_{total}$, the solution candidates 3 and 4, which select routes that do not pass through the domain C to which the policy having a higher importance is set, have better evaluation values than the solution candidates 1 and 2 that pass through the domain. Also, compared to the solution candidate 3, the solution candidate 4 has a smaller resource consumption in the domain A, has the same resource consumption in the domain B, and has a greater transfer latency in the domain D. Since the importance of the policy of the domain A is set higher than the policy of the domain D, it can be seen that the solution value candidate 4, which has a higher conformity to the policy in the domain A, has a better evaluation value of $E_{total}$. As described above, it is understood that a solution is selected according to the importance that has been set.

As described above, according to the embodiment, it is possible to allocate resources in consideration of the importance of policies that are different for respective domains (subsections) of the network.

Note that in the embodiment, the orchestrator 10 is an example of a resource allocation device. The allocation candidate calculator 12 is an example of a splitter and an integrator. The resource allocation calculator 13 is an example of a calculator. The evaluation value calculator 15 is an example of an evaluator. The allocation result determiner 14 is an example of a selector. The evaluation value calculated by the evaluation value calculator 15 is an example of a first evaluation value. The evaluation value $E_{total}$ calculated by the determiner 14 is an example of a second evaluation value.

As above, the embodiments of the present invention have been described in detail. Note that the present invention is not limited to such specific embodiments, and various variations and modifications may be made within the scope of the subject matters of the present invention described in the claims.

The present patent application claims priority based on Japanese Patent Application 2016-156708 filed on Aug. 9, 2016, and entire contents of the Japanese Patent Application are incorporated herein by reference.

LIST OF REFERENCE SYMBOLS 10 orchestrator
11 input receiver
12 allocation candidate calculator
13 resource allocation calculator
14 allocation result determiner
15 evaluation value calculator
16 network route controller
17 service function controller
21 domain DB
22 service function DB
23 facility Information DB
24 resource allocation DB
100 drive unit
101 recording medium
102 auxiliary storage unit
103 memory unit
104 CPU
105 interface unit
106 display unit
107 input unit
B bus

The invention claimed is:

1. A resource allocation device, comprising:
a splitter, implemented by a processor, configured to split requirements related to use of resources of a physical network to which one of a plurality of policies different for each subsection is applied with respect to allocation of the resources, into split requirements for each of the subsections, the plurality of policies including a policy for capital expenditure, a policy for power consumption, and a policy for quality of service;
a calculator, implemented by a processor, configured to calculate, for each of the subsections, a resource allocation that satisfies the split requirements for the subsection according to the one of the plurality of policies applied to the subsection;
an integrator, implemented by a processor, configured to integrate results of the resource allocations by the calculator, to calculate a plurality of solution candidates for a resource allocation that satisfies the requirements for the physical network;
an evaluator, implemented by a processor, configured to calculate, for each of the solution candidates, for each of the subsections, a first evaluation value representing a degree to what extent the resource allocation by the solution candidate in the subsection conforms to the one of the plurality of policies applied to the subsection; and
a selector, implemented by a processor, configured to calculate a second evaluation value obtained by giving weights to the first evaluation values calculated for the respective subsections for each of the solution candidates according to an importance of the one of the plurality of policies applied to the respective subsections, and scalarizing the weighted first evaluation values, to select one of the solution candidates based on comparison of the second evaluation values among the solution candidates,
wherein the importance of the one of the plurality of policies is determined based on factors that are external to the physical network, and
the plurality of policies span different domains.

2. The resource allocation device as claimed in claim 1, wherein the splitter splits the requirements into the split requirements for the respective subsections according to a plurality of split patterns,
wherein the calculator calculates, for each of the split patterns, for each of the subsections, a resource allocation that satisfies the split requirements related to the split pattern with respect to the subsection according to the one of the plurality of policies applied to the subsection,
wherein the integrator integrates, for each of the split patterns, the results of the resource allocations by the calculator, to calculate the solution candidate for the resource allocation that satisfies the requirements for the physical network.

3. A resource allocation method executed by a computer, the method comprising:
splitting requirements related to use of resources of a physical network to which one of a plurality of policies different for each subsection is applied with respect to allocation of the resources, into split requirements for each of the subsections, the plurality of policies including a policy for capital expenditure, a policy for power consumption, and a policy for quality of service;
calculating, for each of the subsections, a resource allocation that satisfies the split requirements for the subsection according to the one of the plurality of policies applied to the subsection;
integrating results of the resource allocations to calculate a plurality of solution candidates for a resource allocation that satisfies the requirements for the physical network;
evaluating, for each of the solution candidates, for each of the subsections, a first evaluation value representing a degree to what extent the resource allocation by the solution candidate in the subsection conforms to the one of the plurality of policies applied to the subsection; and calculating a second evaluation value obtained by giving weights to the first evaluation values calculated for the respective subsections for each of the solution candidates according to an importance of the plurality of policies applied to the respective subsections, and scalarizing the weighted first evaluation values, to select one of the solution candidates based on comparison of the second evaluation values among the solution candidates, wherein the importance of the one of the plurality of policies is determined based on factors that are external to the physical network, and the plurality of policies span different domains.

4. The resource allocation method as claimed in claim 3, wherein the requirements are split into the split requirements for the respective subsections according to a plurality of split patterns, wherein, for each of the split patterns, for each of the subsections, the resource allocation that satisfies the split requirements related to the split pattern with respect to the subsection is calculated according to the one of the plurality of policies applied to the subsection, wherein, for each of the split patterns, the results of the resource allocations are integrated to calculate the solution candidate for the resource allocation that satisfies the requirements for the physical network.

5. The resource allocation device as claimed in claim 1, wherein an importance of each policy of the plurality of policies is preassigned by an operator.

6. The resource allocation method as claimed in claim 3, wherein an importance of each policy of the plurality of policies is preassigned by an operator.

7. The resource allocation device as claimed in claim 1, wherein the scalarizing of the weighted first evaluation values is performed using a linear weighted sum.

8. The resource allocation device as claimed in claim 1, wherein the scalarizing of the weighted first evaluation values is performed using a Tchebyshev scalarization function.

9. The resource allocation device as claimed in claim 1, wherein the scalarizing of the weighted first evaluation values is performed using an extended Tchebyshev scalarization function.

10. The resource allocation method as claimed in claim 3, wherein the scalarizing of the weighted first evaluation values is performed using a linear weighted sum.

11. The resource allocation method as claimed in claim 3, wherein the scalarizing of the weighted first evaluation values is performed using a Tchebyshev scalarization function.

12. The resource allocation method as claimed in claim 3, wherein the scalarizing of the weighted first evaluation values is performed using an extended Tchebyshev scalarization function.

13. The resource allocation device as claimed in claim 1, wherein the factors external to the physical network include a disaster.

14. The resource allocation method as claimed in claim 3, wherein the factors external to the physical network include a disaster.

* * * * *